April 16, 1968   MOTOYOSHI FURUSAWA   3,377,935
SELF-LOADING CAMERA

Filed March 9, 1965   2 Sheets-Sheet 1

INVENTOR.
MOTOYOSHI FURUSAWA
BY Bucknam and Archer
HIS ATTORNEYS

United States Patent Office 3,377,935
Patented Apr. 16, 1968

3,377,935
SELF-LOADING CAMERA
Motoyoshi Furusawa, Ohmiya-shi, Saitama-ken, Japan
Filed Mar. 9, 1965, Ser. No. 438,360
3 Claims. (Cl. 95—31)

ABSTRACT OF THE DISCLOSURE

A self-loading camera having a take-up spool with spring biased hook means adapted to intersect the free path of the film when in extended position in order to engage the perforations of the film and effect automatic loading of the camera.

---

The present invention relates to a self-loading camera, and more particularly to a self-loading camera wherein an end of film is automatically guided toward and wound around a winding spool.

It has previously been necessary, in loading cameras with a cartridge packed with 35 mm. film or a roll of Brownie size film backed with protective lining paper, to insert the leading end of the film into a slit of the take-up or winding spool while pressing down the film together with its protective lining onto a guide member, because curling of the film and the protective linings developed a slack part between the cartridge or the roll of film and the take-up spool. In other words, there has previously not been any definite means for properly positioning a cartridge or roll of film in cameras.

The present invention provides a frictional member on a side wall of the magazine in a camera body, for holding the cartridge or reel from freely rotating out of a predetermined position.

According to the present invention, a winding or take-up spool mounted within a camera is provided with one or more pieces of movable or hooking levers, each of which is hinged to said spool at one end thereof and provided with a free end adapted to extend radially from an axis of said spool by means of a spring.

One preferable embodiment according to the present invention will be described herein in detail with reference to the accompanying drawings, wherein.

Figure 1:
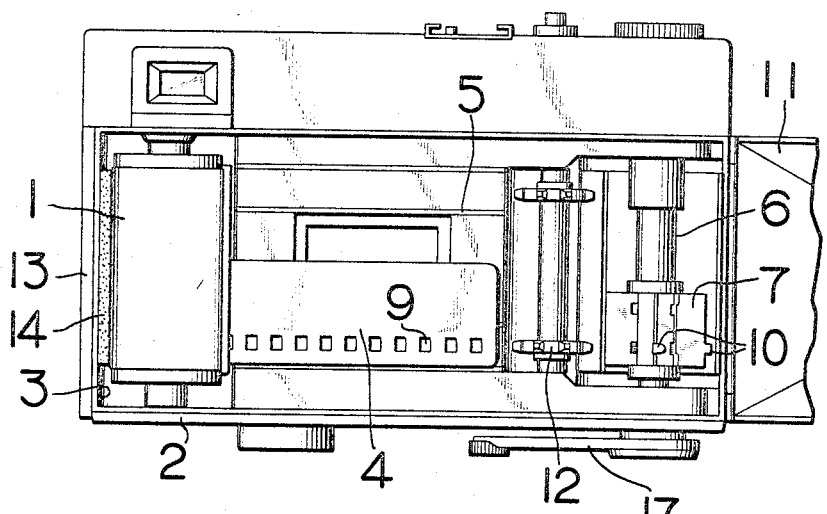
FIG. 1 is a plan view of a camera provided with a device according to the present invention, with its rear cover opened.

With reference to FIGS. 1–4, a cartridge 1 is fitted in a film chamber or magazine 3 in a camera body 2, and the leading end 4 of film is advanced over and along the film guiding surface 5 until the leading end is engaged with a spool 6 by means of hooking arms. Usually in this case, a curly film tends to slack or bulge as indicated by dot-and-dash lines in FIG. 2 and may cause troubles when the back cover 11 of the camera is closed, such as disengagement of the film from the spool 6, and rotation of the cartridge 1 in a counter-clockwise direction. Curling of the film is particularly undesirable for a camera such as of automatic film-loading type shown, wherein the spool 6 is provided with one or several movable or hooking levers 7 supported on pivots 8 and having pawls 10 for engagement with perforations 9 of the film. Such movable or hooking levers 7 may be further provided with springs or the like, which urge said hooking levers 7 to lie in radial direction with respect to the axis of the spool 6, whereby the film end can be simply placed on a sprocket 12, and the film perforations 9 engage with the sprocket as the latter is revolved, the film being carried forward therewith until the engagement of perforations with the pawls 10 is completed.

Figure 4:
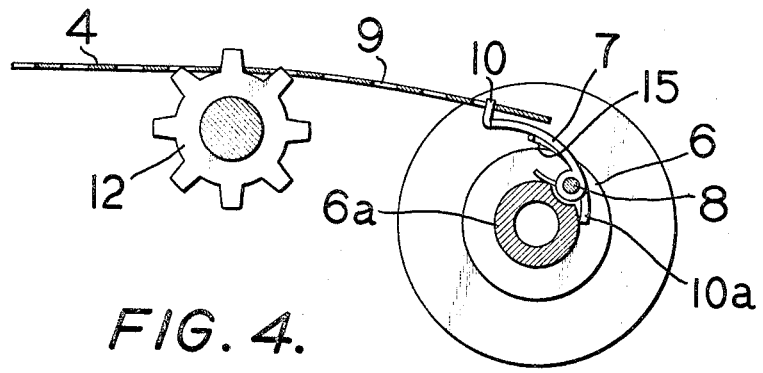
FIG. 4 is a fragmented sectional view, showing a hooking mechanism for perforated film in detail.
Figure 5:
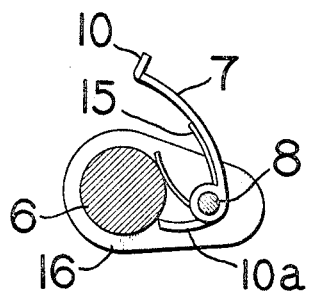
FIGS. 5 and 6 are sectional views showing spools having different forms of construction.
Figure 6:
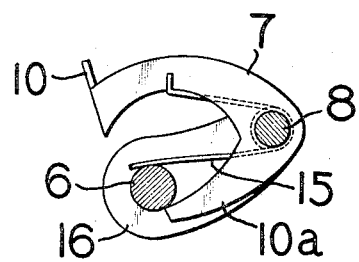

It is preferable to provide a portion of reduced diameter or a recess 6a in the winding spool 6 for accommodating said movable or hooking levers 7 within a diameter of said spool 6, which levers have been pressed inwardly together with their pawls 10 overcoming the pressure of said spring 15. However, the levers 7 themselves may be used as a core for winding film as shown in FIGS. 5 and 6. In this case a respective movable arm 7 is hinged on an arm 16 as at 8, which is located at about opposite ends of said spool 6. In this form, similar parts bear similar reference numerals to those illustrated in FIGS. 1–4.

The present invention provides a frictional member 14 of resilient material such as sponge on an end wall 13 of the film chamber or magazine 3. Resilience of said member makes it possible to set a cartridge 1 in place in a stabilized manner so that the film may be properly carried forward along the guiding surface 5 of the camera body. Accordingly perforations of film will be well engaged with a sprocket and a winding or take-up spool.

Figure 2:
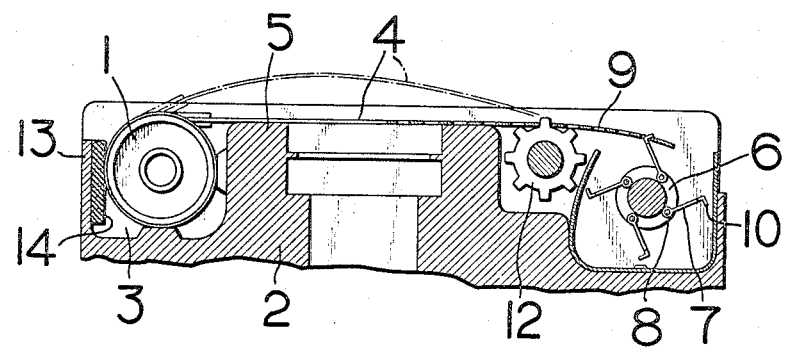
FIG. 2 is a fragmented longitudinal sectional view, showing an illustrative winding spool according to the present invention.
Figure 3:
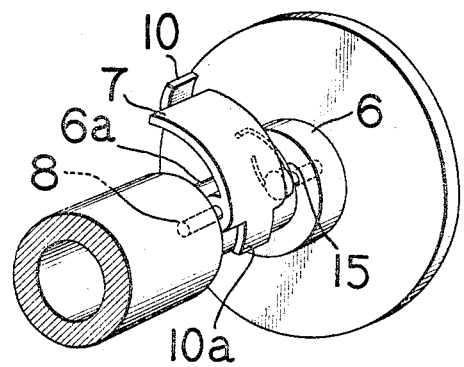
FIG. 3 is a perspective view, showing a hooking lever and its related members in detail.

The operation of one embodiment of the present invention will be explained hereinbelow. Film 4 is inserted first into a cartridge 1, and the leading part of said film 4 is placed over film guides 5 and located so as to engage with a sprocket 12 by fitting a tooth 12a of said sprocket into a perforation 9 of said film 4. Then, the rear cover 11 of the camera is closed and winding spool 6 is rotated by means of a winding lever 17 in a direction to roll up film 4. Accordingly, the film 4 which is meshed with the sprocket 12 through perforations 9 thereof will be fed in a right hand direction as shown in FIGS. 1, 2 and 4. Simultaneously, said spool 6 will tend to roll up slightly more film than that fed out and the balance of said film, will be absorbed by a slip in way of a winding spool and rolled film thereby tending to maintain tooth 12a of said sprocket in an engaged relation with said film 4. Said levers 7 will be tilted inwardly together with its pawled end dependent upon rolled condition of said film, and then will serve to act as a rolling core.

According to the present invention, it is not necessary to insert a leading edge of film into a slit provided in a spool as usually done in existing cameras, and hence a misaligned engagement of film with a winding spool is avoided. Film which is simply loaded into a camera will be accurately and automatically rolled up about a spool.

Thus, it is possible according to the present invention to eliminate inconveniences previously experienced in closing the back cover and in engaging film with a take-up spool, because the cartridge can be set in a stable manner and will not come out of the predetermined position as the film is carried forward along the guiding surface without deflection from the proper direction.

What I claim is:

1. A self-loading camera for use with perforated film, comprising a sprocket and a take-up spool arranged sequentially along the path of said film, said sprocket being rotatable in the same direction as the take-up spool and said spool being positioned directly after the sprocket, hook means on said spool adapted to engage the perforations of said film and spring-biased to extend substantially radially from said take-up spool, said hook means extending from a portion of said spool having a diameter less than the diameter of the remainder of the spool to a position intersecting the free path of said film upon leaving said sprocket, and said hook means being rotationally mounted to fold back under said film to a position within the dimensional clearance of the diameter of said remainder of the spool as the film is wound upon the spool.

2. A self-loading camera according to claim 1 wherein said hook means is rotationally mounted about an axis that is parallel to the axis of said take-up spool and said hook means is biased to an extended position by a compressed spring mounted on the axis of said hook means and bearing against the reduced diameter portion of the take-up spool and a radially inward point on said hook means.

3. A self-loading camera according to claim 1 wherein said hook means comprises a plurality of similar elements spaced about the periphery of said take-up spool.

References Cited

UNITED STATES PATENTS

| 1,346,356 | 7/1920 | Wenderhold | 242—55.11 |
| 3,266,397 | 7/1966 | Kremp et al. | 95—31 |
| 3,266,398 | 7/1966 | Kremp et al. | 95—31 |

FOREIGN PATENTS 217,844   10/1961   Austria.

NORTON ASHER, *Primary Examiner.*

JOSEPH F. PETERS, Jr., *Assistant Examiner.*

UNITED STATES PATENT OFFICE
CERTIFICATE OF CORRECTION

Patent No. 3,377,935                          April 16, 1968

Motoyoshi Furusawa

It is certified that error appears in the above identified patent and that said Letters Patent are hereby corrected as shown below:

In the heading to the printed specification, line 3, "Motoyoshi Furusawa, Ohmiya-shi, Saitama-ken, Japan" should read -- Motoyoshi Furusawa, Ohmiya-shi, Saitama-ken, Japan, assignor to Fuji Shashin Koki Kabushiki Kaisha, Saitama-ken, Japan --.

Signed and sealed this 14th day of October 1969.

(SEAL)
Attest:

Edward M. Fletcher, Jr.                      WILLIAM E. SCHUYLER, JR.
Attesting Officer                                 Commissioner of Patents